(12) United States Patent
Pothula et al.

(10) Patent No.: US 10,904,368 B2
(45) Date of Patent: Jan. 26, 2021

(54) SYSTEM, METHOD AND DEVICES FOR MKA NEGOTIATION BETWEEN THE DEVICES

(71) Applicant: Huawei Technologies Co., Ltd., Shenzhen (CN)

(72) Inventors: Dharmanandana Reddy Pothula, Bangalore (IN); Chandra Mohan Padamati, Bangalore (IN); Antony Paul, Bangalore (IN); Yun Qin, Shanghai (CN); De Sheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/420,959

(22) Filed: May 23, 2019

(65) Prior Publication Data

US 2019/0281031 A1 Sep. 12, 2019

Related U.S. Application Data

(63) Continuation of application No. PCT/CN2017/111141, filed on Nov. 15, 2017.

(30) Foreign Application Priority Data

Nov. 26, 2016 (IN) .............................. 201641040427

(51) Int. Cl.
*H04L 29/08* (2006.01)
*H04L 9/08* (2006.01)
(Continued)

(52) U.S. Cl.
CPC .......... *H04L 69/324* (2013.01); *H04L 9/0838* (2013.01); *H04L 9/0844* (2013.01);
(Continued)

(58) Field of Classification Search
CPC ..... H04L 69/324; H04L 9/0844; H04L 63/00; H04L 9/0838; H04L 63/061; H04L 63/08;
(Continued)

(56) References Cited

U.S. PATENT DOCUMENTS 7,171,555 B1 * 1/2007 Salowey ......... H04W 12/04071
713/156
7,325,246 B1 * 1/2008 Halasz .................. H04W 12/06
726/2
(Continued)

FOREIGN PATENT DOCUMENTS

| CN | 102857521 A | 1/2013 |
|---|---|---|
| CN | 103401682 A | 11/2013 |
| CN | 105450547 A | 3/2016 |

OTHER PUBLICATIONS

"Weis, B., IEEE Std. 802.1X as an P802.15.9 KMP, Jan. 2014, IEEE, pp. 1-6" (Year: 2014).*
(Continued)

*Primary Examiner* — Saleh Najjar
*Assistant Examiner* — Nhan Huu Nguyen
(74) *Attorney, Agent, or Firm* — Slater Matsil, LLP (57) ABSTRACT

Disclosed are a system, method and devices for simultaneous MACsec key agreement (MKA) negotiation between the devices. The present application controls a basic TLV message exchange between supplicant and authenticator in case of race condition to establish the secure association key (SAK) channel. The present application by controlling a basic TLV message exchange enables to establish a secure channel in race condition and achieves a high reliability of the product as this makes product launch MACsec services quickly and available for the service. Accordingly, when both sides (two supplicants) exchange hello with basic TLV at the same time, triggering the race condition, drops first message from the authenticator at supplicant and update the (Continued)

peer MN and the supplicant will not send reply. The authenticator when send next message (basic+potential peer TLV) with peer MN incremented by 1, the supplicant will respond with incremental message with live peer TLV.

20 Claims, 5 Drawing Sheets

(51) Int. Cl.
    *H04L 29/06* (2006.01)
    *H04W 84/12* (2009.01)
    *H04W 12/04* (2009.01)

(52) U.S. Cl.
    CPC ............ *H04L 63/00* (2013.01); *H04L 63/061* (2013.01); *H04L 63/08* (2013.01); *H04L 63/10* (2013.01); *H04L 63/162* (2013.01); *H04L 63/20* (2013.01); *H04W 12/04031* (2019.01); *H04W 84/12* (2013.01)

(58) Field of Classification Search
    CPC ....... H04L 63/10; H04L 63/162; H04L 63/20; H04W 12/04031; H04W 84/12
    See application file for complete search history.

(56) References Cited

U.S. PATENT DOCUMENTS

| | | | | |
|---|---|---|---|---|
| 2004/0103282 A1* | 5/2004 | Meier | ............... | H04L 9/0891 713/171 |
| 2005/0177733 A1* | 8/2005 | Stadelmann | ...... | H04M 15/8038 713/185 |
| 2006/0236109 A1* | 10/2006 | Krischer | ............. | H04L 63/0815 713/171 |
| 2007/0124439 A1* | 5/2007 | Shah | ...................... | H04L 69/32 709/223 |
| 2007/0254661 A1* | 11/2007 | Chowdhury | .......... | H04W 36/02 455/436 |
| 2007/0297611 A1* | 12/2007 | Yun | ................... | H04W 12/0609 380/270 |
| 2008/0065884 A1* | 3/2008 | Emeott | ............. | H04W 12/0602 713/168 |
| 2008/0137853 A1* | 6/2008 | Mizikovsky | .......... | H04L 9/0631 380/247 |
| 2009/0217033 A1* | 8/2009 | Costa | ................ | H04W 12/0403 713/155 |
| 2010/0211790 A1* | 8/2010 | Zhang | .................. | H04L 9/3297 713/171 |
| 2011/0026714 A1 | 2/2011 | Thomas et al. | | |
| 2013/0305332 A1* | 11/2013 | Narasimhan | .......... | H04L 63/064 726/7 |
| 2014/0233738 A1* | 8/2014 | Chunduri | ................ | H04L 45/00 380/277 |
| 2016/0212150 A1* | 7/2016 | Thubert | ................ | H04L 63/126 |

OTHER PUBLICATIONS

"Nystroem, M., The EAP Protected One-Time Password Protocol (EAP-POTP) (RFC4793), Feb. 2007, Internet Society Requests for Comments, pp. 10-11 and 60" (Year: 2007).*

Hedayat, et al., "A Two-Way Active Measurement Protocol (TWAMP)," Network Working Group, Request for Comments: 5357, Oct. 2008, 26 pages.

* cited by examiner

FIGURE 1

A+1 -> Hello msg with Basic TLV with MNa: 1 MNb:0
B+1 -> Hello msg with TLVs with MNa: 1 MNb:1
A+2 -> Hello msg with TLVs with MNa: 2 peer MNb:1
B+2 -> Hello msg with TLVs with MNa: 2 MNb:2
A+3 -> Hello msg with TLVs with MNa: 3 MNb:2

A+1 -> hello msg with Basic TLV with self MNa:1 peer MNb:0
B+1 -> hello msg with Basic TLV with self MNa:0 peer MNb:1
A+2 -> hello msg with (Basic TLV + potential TLV) with self MNa:2 peer MNb:1
B+2 -> hello msg with (Basic TLV + potential TLV) with self MNa:1 peer MNb:2

FIGURE 4

A+1 -> hello msg with Basic TLV with MNa: 1 MNb:0
B+1 -> hello msg with TLVs with MNa: 0 MNb:1
B+2 -> hello msg with TLVs with MNa: 1 MNb:2
A+2 -> hello msg with TLVs with MNa: 2 peer MNb:2
B+3 -> hello msg with TLVs with MNa: 2 MNb:3
A+3 -> hello msg with TLVs with MNa: 3 MNb:3

SYSTEM, METHOD AND DEVICES FOR MKA NEGOTIATION BETWEEN THE DEVICES

CROSS-REFERENCE TO RELATED APPLICATIONS

This application is a continuation of International Application No. PCT/CN2017/111141, filed on Nov. 15, 2017, which claims priority to India Patent Application No. IN201641040427 filed on Nov. 26, 2016. The disclosures of the aforementioned applications are hereby incorporated herein by reference in their entireties.

TECHNICAL FIELD

The present subject matter described herein, in general, relates to communication networks and more particularly to port-based network access control.

BACKGROUND

IEEE 802.1AE is the IEEE MAC Security standard (also known as MACsec) and defines connectionless data confidentiality and integrity for media access independent protocols. MACsec is defined for authenticating and encrypting packets between two MACsec-capable devices. However, key management and the establishment of secure associations are specified by IEEE 802.1X-2010. IEEE 802.1X is an IEEE Standard for Port-based Network Access Control (PNAC) and is part of the IEEE 802.1 group of networking protocols. IEEE 802.1X provides an authentication mechanism to devices wishing to attach to a local area network (LAN) or wireless local area network (WLAN). Specifically, MACsec provides a secure communication on a wired LAN. IEEE 802.1X defines two logical port entities for an authenticated port: a "controlled port" and an "uncontrolled port". The controlled port is manipulated by the 802.1X PAE (Port Access Entity) to allow (in the authorized state) or prevent (in the unauthorized state) network traffic ingressing and egressing to/from the controlled port. The uncontrolled port is used by the 802.1X PAE to transmit and receive Extensible Authentication Protocol over LAN (EAPOL) frames.

Generally, 802.1X authentication involve three parties: a supplicant, an authenticator, and an authentication server. The supplicant is a client device (such as a laptop) that wishes to attach to the LAN/WLAN. The term 'supplicant' is also used interchangeably to refer to the software running on the client that provides credentials to the authenticator. To support MACsec, the supplicant should be able to manage MACsec key negotiation and encrypt packets. The authenticator is a network access device that facilitates the authentication process by replaying the supplicant's credentials to the authentication server. The authenticator may be an Ethernet switch or a wireless access point. The authentication validates the supplicant's credentials and determines what network access the supplicant should receive. The authentication server may be a RADIUS server. In MACsec, the authentication server plays an important role in the distribution of master keying material to the supplicant and authenticator. In addition, the authentication server can define the MACsec policy to be applied to a particular endpoint. A MACsec agreement includes three phases: an authentication phase, a key negotiation and a message encryption transmission phase as shown in FIG. 1.

Figure 1:
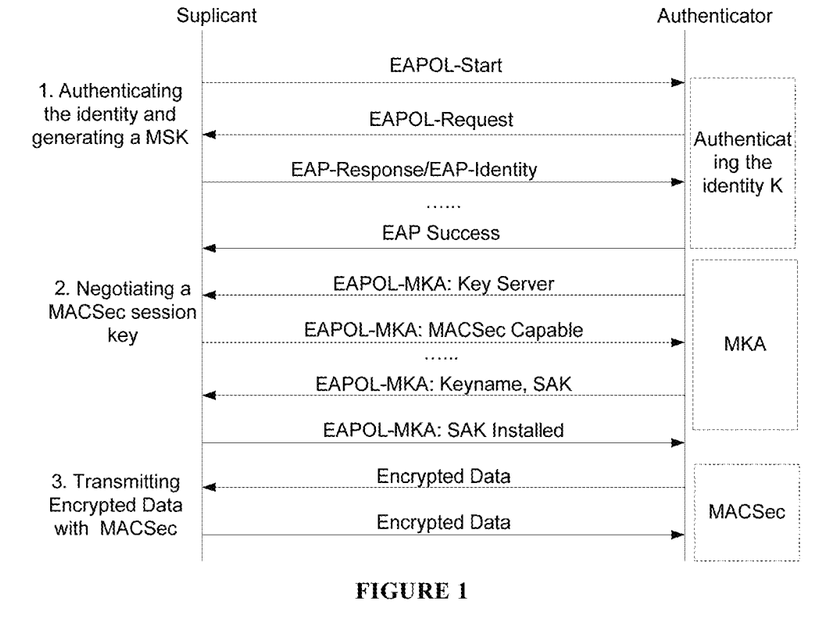
FIG. 1 illustrates the authentication phase, a key negotiation and message encryption transmission phase associated with the MACsec agreement, according to the prior-art.

As shown in FIG. 1, in the authentication phase a supplicant port access entity (PAE) and an authenticator PAE will commonly use an extensible authentication protocol transport layer security (EAP-TLS) method for 802.1x authentication process, with a two-way certificate exchange. The ports on both PAEs are declared secure after successful exchange and validation of peer PAE's certificate. The process is repeated periodically to re-authenticate the PAE to enhance security. The default period of the authentication phase is 3600 s.

In the key agreement phase, while authentication process, the PAEs first negotiate a master session key (MSK). According to MACsec Key Agreement protocol (MKA), the MSK is used to generate CAK (Connectivity Association Key). One PAE is chosen as a key server and this PAE acting as the key server generates a key, encrypts and sends the key to other PAEs. The key server periodically updates the key to prevent cracking. The default cycle of the key agreement phase is 1800 s.

In encrypted transmission phase, 802.1AE-2006 defines the process of encrypting the messages sent from the secured port. The key used for encryption is generated distributed to all other PAEs during key agreement.

Figure 2:
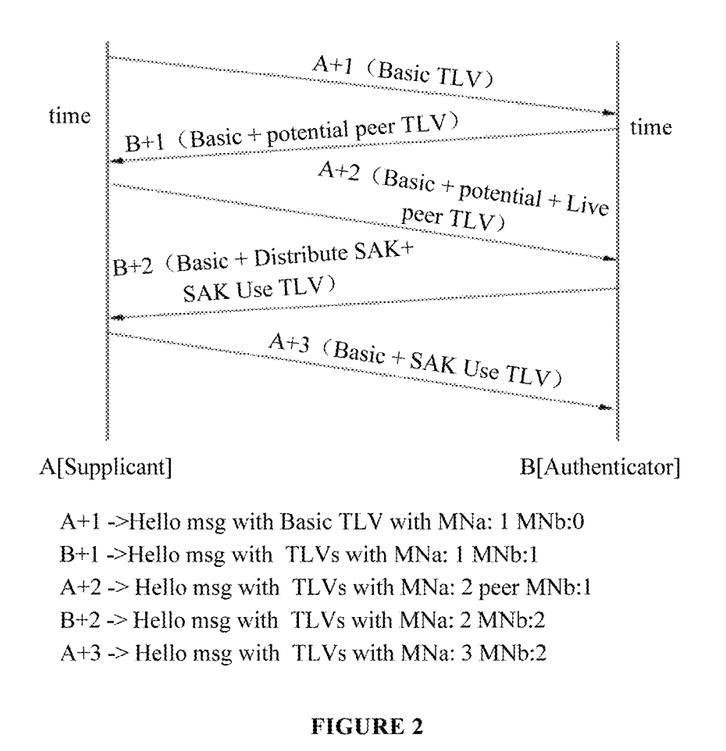
FIG. 2 illustrates MKA process between 2 PAEs, according to the prior-art.

Referring now to FIG. 2, MKA process between 2 PAEs (one designated as authenticator and the other as supplicant) is as shown. The PAE A (supplicant) initiates MKA process by sending a MACsec key agreement protocol data unit (MKPDU) with just basic Type-Length-Value (TLV) information. This TLV contains a field called Message Number (MN), which has to be unique for every MKPDU, and has to be incremented for each packet that is sending out. On receiving an MKPDU, if a basic authentication is successful, then the receiver PAE B (authenticator) stores the received MN and reflects this by sending back a response with PAE B's MKPDU, wherein PAE B's MKPDU includes a potential peer TLV. When PAE A receives this response from PAE B, PAE A checks the potential peer TLV in the response. The potential peer TLV should contain a Message Indicator (MI) and an MN used in the last MKPDU that was sent to PAE B. If the MN in the potential peer TLV is older, PAE A rejects this TLV. If the potential peer TLV is acceptable, PAE A adds PAE B to a list of live peer. MKA key is distributed once both PAE A and PAE B add each other to their live peer list.

Figure 3:
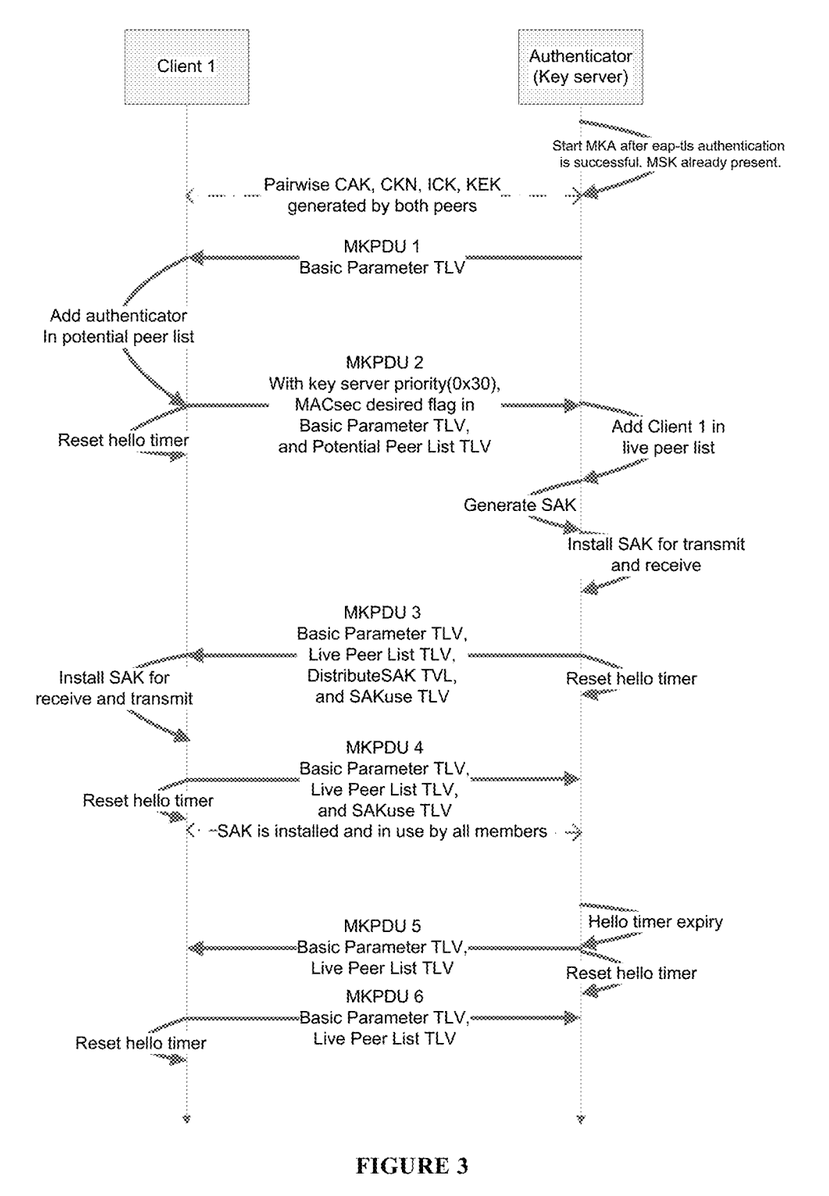
FIG. 3 illustrates another MKA process, according to the prior-art.

Referring now to FIG. 3, a conventional MKA process is shown. In the MKA process of FIG. 3, it is expected that only one of the PAE initiates MKA process at a time. However, as per standard, there is no mechanism to control when a PAE initiates MKA process. So, if multiple PAEs come alive simultaneously (for example, say 2 devices startup at the same time), they may all initiate MKA process simultaneously. This can lead to the MKA failure, and a secure data channel cannot be established. MACsec protocol does not define a mechanism to prevent the above scenario.

Figure 4:
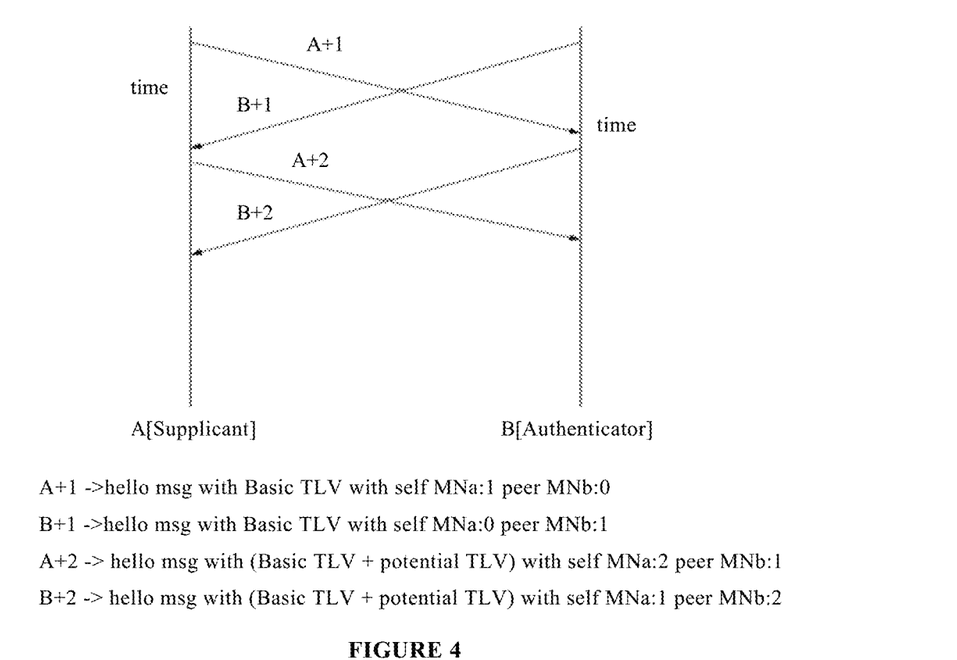
FIG. 4 illustrates a simultaneous initiation of MKA negotiations between PAE A and PAE B, according to the prior-art.

Referring now to FIG. 4, a scenario of simultaneous initiation of MKA negotiations between PAE A and PAE B and the associated limitation or technical problem to the same. As shown in FIG. 4, PAE A and PAE B initiate MKA by sending an MKPDU with basic parameter TLV containing the associated message indicator (MI) and MN. When PAE A receives the MKPDU sent by PAE B, PAE A add PAE B to PAE A's live peer list only if the received MKPDU contains the most recent MI and MN sent by PAE A. Since MKA was initiated simultaneously, the MKPDUs from PAE A and PAE B are sent at the same time, so the last MI and MN sent from PAE A will never be reflected back by PAE B. Therefore, the peer liveness cannot be established, and MKA keys are not distributed and a secure data channel cannot be build.

The above-described deficiencies of existing MKA negotiation between PAE entities are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to system, method and devices for simultaneous MACsec key agreement (MKA) negotiation between the devices, and the same are further described below in the detailed description. This summary is not intended to identify essential features of the claimed subject matter nor is it intended for use in determining or limiting the scope of the claimed subject matter.

An objective of the present application is to solve the technical problem as recited above by controlling the basic Type-Length-Value (TLV) message exchange between the PAE's (supplicant and authenticator) in case of race condition to establish a secure association key (SAK) channel.

Another objective of the present application is to provide a system, device and a method for simultaneous MKA negotiation between PAE entities (supplicant and authenticator).

Accordingly, the present application provides a system. The system is used for provisioning a simultaneous key negotiation process to achieve secure communication, and has a plurality of port access entities. The system comprises at least one first port access entity, from the plurality of port access entities, adapted to initiate a key agreement process by sending a first message with at least a basic TLV information to at least one second port access entity from the plurality of port access entities, the TLV comprises at least a message number (MN) and a message indicator (MI) unique for the first message sent; receive a second message with at least a potential peer TLV from the at least one second port access entity in response to the first message, the potential peer TLV comprises at least a message number (MN) and a message indicator (MI) unique for at least one message received eventually by the at least one second port access entity; detect an occurrence of a simultaneous key agreement process session initiation, indicating a race condition, based at least on the message number (MN) received with the second message; store, if the race condition is detected, the message number (MN) received with the second message; and respond by sending a third message to the at least one second port access entity with the message number (MN) stored and a live peer TLV to achieve the key agreement process, wherein the third message is sent when the message number (MN) associated with the first message is received in the potential peer TLV from the at least one second port access entity.

In one implementation, the present application provides method for provisioning a simultaneous key negotiation process to achieve secure communication. The method includes initiating, by at least one first port access entity, a key agreement process by sending a first message with at least a basic TLV information to at least one second port access entity, the TLV comprises at least a message number (MN) and a message indicator (MI) unique for the first message sent; receiving, by the at least one first port access entity, a second message with at least a potential peer TLV from the at least one second port access entity in response to the first message, the potential peer TLV comprises at least a message number (MN) and a message indicator (MI) unique for at least one message received eventually by the at least one second port access entity; detecting an occurrence of a simultaneous key agreement process session initiation, indicating a race condition, based at least on the message number (MN) received with the second message; storing, if the race condition is detected, by the at least one first port access entity, the message number (MN) received with the second message; and responding, by the at least one first port access entity, by sending a third message with the message number (MN) stored and a live peer TLV to achieve the key agreement process, wherein the third message is sent when the message number (MN) associated with the first message is received in the potential peer TLV from the at least one second port access entity.

In one implementation, the present application provides a device for provisioning a simultaneous key negotiation process to achieve secure communication. The device includes a processor and a memory coupled to the processor for executing a plurality of modules present in the memory. The plurality of modules includes a transmitting module, a receiving module, a detection module, a storage module, and a response module.

The transmitting module is configured to initiate a key agreement process by sending a first message with at least basic TLV information to at least one port access entity, the TLV comprises at least a message number (MN) and a message indicator (MI) unique for the first message sent.

The receiving module is configured to receive a second message with at least a potential peer TLV from the at least one port access entity in response to the first message, the potential peer TLV comprises at least a message number (MN) and a message indicator (MI) unique for at least one message received eventually by the at least one port access entity.

The detection module is configured to detect an occurrence of a simultaneous key agreement process session initiation, indicating a race condition, based at least on the message number (MN) received with the second message.

The storage module is configured to store the message number (MN) received with the second message if the race condition is detected.

The response module is configured to respond by sending a third message to the at least one second port access entity with the message number (MN) stored and a live peer TLV to achieve the key agreement process, wherein the third message is sent when the message number (MN) associated with the first message is received in the potential peer TLV from the at least one second port access entity.

In contrast to the available techniques, the present application enables to establish the secure channel in race condition scenario and helps in achieving high reliability of the product as this makes product launch MACsec services quickly and available for the service.

The various options and preferred embodiments referred to above in relation to the first implementation are also applicable in relation to the other implementations.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

It is to be understood that the attached drawings are for purposes of illustrating the concepts of the application and may not be to scale.

DETAILED DESCRIPTION OF ILLUSTRATIVE EMBODIMENTS

The application can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the application may take, may be referred to as techniques. In general, the order of the steps of disclosed processes may be altered within the scope of the application.

A detailed description of one or more embodiments of the application is provided below along with accompanying figures that illustrate the principles of the application. The application is described in connection with such embodiments, but the application is not limited to any embodiment. The scope of the application is limited only by the claims and the application encompasses numerous alternatives, modifications and equivalents. Numerous specific details are set forth in the following description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

In the following detailed description, numerous specific details are set forth in order to provide a thorough understanding of the application. However, it will be understood by those skilled in the art that the present application may be practiced without these specific details. In other instances, well-known methods, procedures, and components, modules, units and/or circuits have not been described in detail so as not to obscure the application.

Although embodiments of the application are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the application are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

System, method and devices for simultaneous MACsec key agreement (MKA) negotiation between the devices are disclosed.

While aspects are described for system, method and devices for simultaneous MKA negotiation between the devices, the present application may be implemented in any number of different computing systems, environments, and/or configurations, the embodiments are described in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Referring again to FIG. 4, PAE A initiates MKA by sending an MKPDU with basic parameter Type-Length-Value (TLV) and the basic parameter TLV contains an associated MI and an associated MN. When PAE A receives the MKPDU sent by PAE B, PAE A adds PAE B to PAE A's live peer list when the received MKPDU contains the most recent MI and MN sent by PAE A. Since MKA was initiated simultaneously, MKPDUs from PAE A and PAE B are sent at the same time, so the last sent MI and MN from PAE A will never be reflected back by PAE B. Therefore, peer liveness cannot be established, and MKA keys are not distributed and a secure data channel cannot be build. Such scenario is referred to as a race condition throughout the application. The race condition is a condition wherein the MKA is initiated simultaneously by multiple devices and the MKPDU from PAE A and PAE B are sent at the same time, so the last send MI and MN from PAE A will never be reflected back by PAE B.

Such race condition can be avoided if the supplicant (sender) can detect that the potential peer (an authenticator) does not receive the last MI and MN, and the supplicant can drop an MKPDU from the authenticator but the supplicant updates the MI and MN in potential peer list.

Thus, the present application controls a basic TLV message exchange between a supplicant and an authenticator in case of race condition to establish the secure association key (SAK) channel. The present application controls a basic TLV message exchange and a secure channel can be established in race condition scenario and improves reliability of the product and the product can launch MACsec services quickly and available for the service.

Accordingly, when both sides (two supplicants) exchange hello with basic TLV at the same time, triggering the race condition, the supplicant drop firstly a message from the authenticator (peer) and update the peer MN and the supplicant will not reply. The authenticator sends a next message (basic+potential peer TLV) with a peer MN incremented by 1, the supplicant will respond with reply message with live peer TLV and the reply message has an MN incremented by 1.

In one implementation, the present application provides a mechanism detecting the occurrence of simultaneous MKA session initiation, and the supplicant holding back from the negotiation till the race condition disappears.

The supplicant may recognize a race condition when the supplicant receives an MKA basic parameter TLV from the peer (authenticator) but the supplicant does not receive a reply after the supplicant has sent a MKA basic parameter TLV to that peer before. In this case, the supplicant recognize simultaneous session initiation, the supplicant will store an MN received from the supplicant's peer but does not respond to the peer till the supplicant is reflected in the peer's MKA message under potential or live peer TLV.

Figure 5:
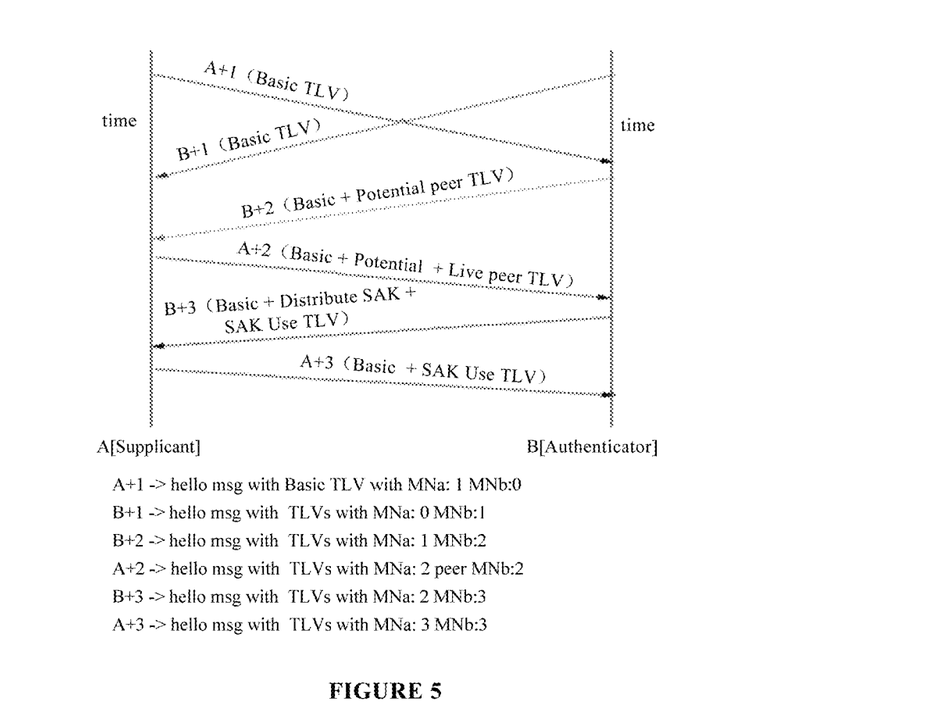
FIG. 5 illustrates a MKA session, in accordance with an embodiment of the present subject matter.

Referring now to FIG. 5 illustrates a MKA session to avoid a race condition by using the mechanism of the present application. As shown in FIG. 5, the supplicant recognizes that the MKPDU with MN B+1 is received instead of MN A+1, due to simultaneous initiation. The supplicant records the MN B+1 from the peer. Then the supplicant may drop the MKPDU. The authenticator processes the initial MKPDU sent by the supplicant and sends a next MKPDU reflecting the supplicant's latest MI and MN. Since only one side drops the MKPDU, the race condition is broken and the MKA process proceeds normally. The key exchange may succeed and a secure data channel may be established.

Figure 6:
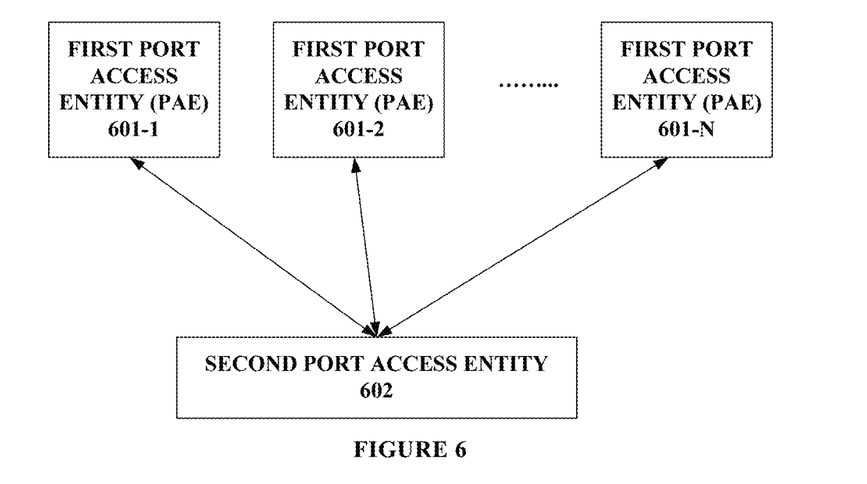
FIG. 6 illustrates a system, for provisioning a simultaneous key negotiation process to achieve secure communication, having a plurality of port access entities, in accordance with an embodiment of the present subject matter.

Referring now to FIG. 6, a system for provisioning a simultaneous key negotiation process to achieve secure communication is disclosed. The system includes a plurality of port access entities. The system comprises at least one first port access entity 601-1, 601-2, ... 601-N, collectively referred to as 601 hereinafter, from the plurality of port access entities. The first port access entity 601 is configured to initiate a key agreement process by sending a first message with at least basic TLV information to at least one second port access entity 602 from the plurality of port access entities, the TLV information comprises at least a message number (MN) and a message indicator (MI) unique for the first message. The first port access entity 601 receive a second message with at least a potential peer TLV from the at least one second port access entity in response to the first message. The potential peer TLV comprises at least an MN and an MI unique for at least one message received eventually by the at least one second port access entity 602. The first port access entity 601 detect an occurrence of a simultaneous key agreement process session initiation, indicating a race condition, based at least on the received MN together with the second message. The first port access entity 601 stores, if the race condition is detected, the MN received together with the second message. The first port access entity 601 then responds by sending a third message to the at least one second port access entity with the stored MN and a live peer TLV to achieve the key agreement process, wherein a third message is sent when the MN associated with the first message is received in the potential peer TLV from the at least one second port access entity.

In one implementation, the race condition occurs if multiple first port access entities from the plurality of port access entities initiate a key agreement process simultaneously.

In one implementation, the race condition is identified when the potential peer TLV received from the peer does not contain the MN for the first message sent by the sender even after having sent the basic TLV information to the peer.

In one implementation, the key agreement process is a MAC security (MACsec) Key Agreement protocol (MKA) key negotiation process.

In one implementation, the first message, the second message and the third message are MAC security (MACsec) key agreement protocol data unit (MKPDU).

In one implementation, the at least one first port access entity receives the message number (MN) associated with the first message in the potential peer TLV from the at least one second port access entity under potential or live peer TLV.

In one implementation, the at least one first port access entity is further configured to hold response, upon occurrence of the race condition, to the at least one second port access entity till the race condition is avoided.

In one implementation, the race condition is avoided when the supplicant is reflected in the peers MKA message under potential or live peer TLV.

In one implementation, the system is technical advanced over the prior-art as it provides a simultaneous MACsec Key Agreement (MKA) negotiation between the port access entities to achieve secure communication on wired network.

In one implementation, the at least one second port access entity is configured to process the first message received.

Although the present subject matter is explained considering that the at least one first port access entity 601 is implemented as a first port access entity, it may be understood that the at least one first port access entity 601 may also be implemented in a variety of computing systems, such as a laptop computer, a desktop computer, a notebook, a workstation, a mainframe computer, a server, a network server, and the like. It will be understood that the at least one first port access entity 601 may be accessed by multiple users through one or more user devices, or applications residing on the user devices. Examples of the at least one first port access entity 601 may include, but are not limited to, a portable computer, a personal digital assistant, a handheld device, and a workstation. The at least one first port access entity 601 are communicatively coupled to the at least one second port access entity 602 through a network (not shown).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

Figure 7:
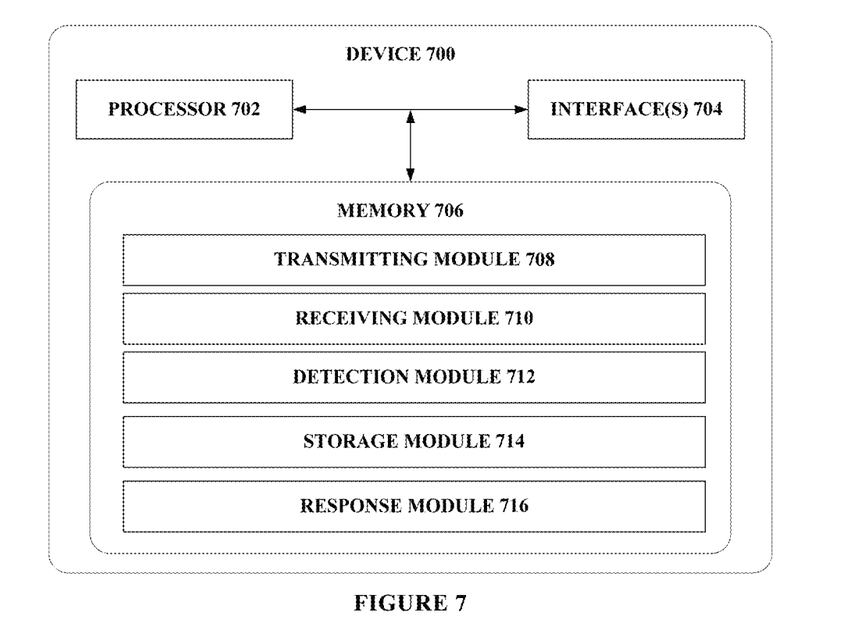
FIG. 7 illustrates a device for provisioning a simultaneous key negotiation process to achieve secure communication, in accordance with an embodiment of the present subject matter.

Referring now to FIG. 7, a device 700 for provisioning a simultaneous key negotiation process to achieve secure communication is illustrated in accordance with an embodiment of the present subject matter.

In one embodiment, the device 700 comprises a memory 706 and a processor 702 communicating with the memory 706. Optionally, the device 700 comprises an I/O interface 704 and an interconnection mechanism coupling the memory 706, the processor 702 and the communications interface 704. The processor 702 may be implemented as one or more microprocessors, microcomputers, microcontrollers, digital signal processors, central processing units, state machines, logic circuitries, and/or any devices that manipulate signals based on operational instructions. Among other capabilities, the at least one processor 702 is configured to fetch and execute computer-readable instructions stored in the memory 706.

The I/O interface 704 may include a variety of software and hardware interfaces, for example, a web interface, a graphical user interface, and the like. The I/O interface 704 may allow device 700 to interact with a user directly or through the user devices 704. Further, the I/O interface 704 may enable the device 700 to communicate with other computing devices, such as web servers and external data servers (not shown). The I/O/user interface 704 can facilitate multiple communications within a wide variety of networks and protocol types, including wired networks, for example, LAN, cable, etc., and wireless networks, such as WLAN, cellular, or satellite. The I/O interface 704 may include one or more ports for connecting a number of devices to one another or to another server.

The memory 706 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 706 may include modules and data (not shown).

The modules include routines, programs, objects, components, data structures, etc., which perform particular tasks or implement particular abstract data types. In one embodiment, the plurality of modules includes a transmitting module 708, a receiving module 710, a detection module 712, a storage module 714, and a response module 716.

The transmitting module 708 is configured to initiate a key agreement process by sending a first message with at least basic TLV information to at least one port access entity, the TLV comprises at least a message number (MN) and a message indicator (MI) unique for the first message sent.

The receiving module 710 is configured to receive a second message with at least a potential peer TLV from the at least one port access entity in response to the first message, the potential peer TLV comprises at least a message number (MN) and a message indicator (MI) unique for at least one message received eventually by the at least one port access entity.

The detection module 712 is configured to detect an occurrence of a simultaneous key agreement process session initiation, indicating a race condition, based at least on the message number (MN) received with the second message.

The storage module 714 is configured to store the message number (MN) received with the second message if the race condition is detected.

The response module 716 is configured to respond by sending a third message to the at least one second port access entity with the message number (MN) stored and a live peer TLV to achieve the key agreement process, wherein the third message is sent when the message number (MN) associated with the first message is received in the potential peer TLV from the at least one second port access entity.

In one implementation, the race condition occurs if multiple devices initiate a key agreement process simultaneously.

In one implementation, the race condition is identified when the potential peer TLV received from the peer does not contain the message number (MN) for the first message sent by the sender even after having sent the basic TLV information to the peer.

In one implementation, the key agreement process is a Mac security (MACsec) Key Agreement protocol (MKA) key negotiation process.

In one implementation, the first message, the second message and the third message are Mac security (MACsec) key agreement protocol data unit (MKPDU).

In one implementation, the at least one first port access entity receives the message number (MN) associated with the first message in the potential peer TLV from the at least one second port access entity under potential or live peer TLV.

In one implementation, the device is further configured to hold response, upon occurrence of the race condition, to the at least one second port access entity till the race condition is avoided.

In one implementation, the race condition is avoided when the supplicant is reflected in the peers MKA message under potential or live peer TLV.

In one implementation, the at least one second port access entity is adapted to process the first message received.

Figure 8:
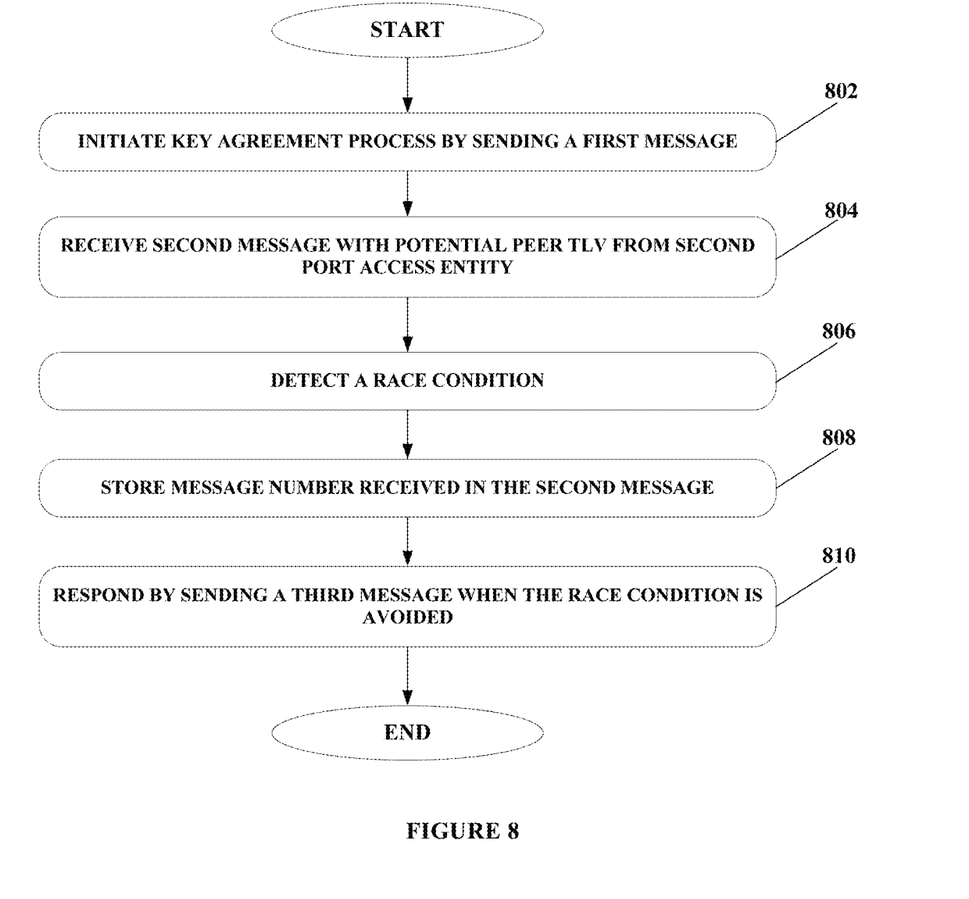
FIG. 8 illustrates a method for provisioning a simultaneous key negotiation process to achieve secure communication, in accordance with an embodiment of the present subject matter.

Referring now to FIG. 8, a method for provisioning a simultaneous key negotiation process to achieve secure communication is illustrated, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described device 700 and/or the at least one second port access entity 601.

At block 802, at least one first port access entity initiates a key agreement process by sending a first message with at least basic TLV information to at least one second port access entity, the TLV comprises at least a message number (MN) and a message indicator (MI) unique for the first message.

In one embodiment, the key agreement process is a MAC security (MACsec) Key Agreement protocol (MKA) key negotiation process.

At block 804, the at least one first port access entity 60*i* receives a second message with at least a potential peer TLV from the at least one second port access entity 602 in response to the first message, the potential peer TLV comprises at least a message number (MN) and a message indicator (MI) unique for at least one message received eventually by the at least one second port access entity 602.

In one embodiment, the first port access entity 60*i* receives the message number (MN) associated with the first message in the potential peer TLV from the at least one second port access entity under potential or live peer TLV.

At block 806, the at least one first port access entity 601 detects an occurrence of a simultaneous key agreement process session initiation, indicating a race condition, based at least on the message number (MN) received with the second message.

In one embodiment, upon detection of the race condition, the at least one second port access entity 601 holds sending response to the at least one second port access entity 602 till the race condition is avoided.

At block 808, if the race condition is detected, the at least one first port access entity 601 stores the message number (MN) received with the second message. The race condition is identified when the potential peer TLV received from the peer does not contain the message number (MN) for the first message sent by the sender even after having sent the basic TLV information to the peer.

In one embodiment, the race condition occurs if multiple first port access entities from the plurality of port access entities initiate a key agreement process simultaneously.

At block 808, when the message number (MN) associated with the first message is received by the at least one first port access entity 601 in the potential peer TLV from the at least one second port access entity, the at least one first port access entity 601 responds to the at least one second port access entity 602 by sending a third message with the message number (MN) stored and a live peer TLV to achieve the key agreement process.

In one embodiment, the first entity 601 responds to the second entity upon avoiding the race condition detected. The race condition is avoided when the supplicant is reflected in the peers MKA message under potential or live peer TLV.

The method is technical advance over the prior-art literature as the method provides a simultaneous MACsec Key Agreement (MKA) negotiation between the port access entities to achieve secure communication on wired network.

In one embodiment, the first message, the second message and the third message are MAC security (MACsec) key agreement protocol data unit (MKPDU).

Apart from what is discussed above, some of the other advantages and feature of the present subject matter are as provided below:

i. The present application enables the supplicant to drop the Peer's 'hello' message at supplicant upon detection of a race condition.
ii. The present application enables the supplicant to record a message number of the peer.
iii. The present application enables the supplicant to send a response from the authenticator with an incremental number.
iv. The present application enables to establish the secure channel in race condition scenario.
v. The present application achieves high reliability of the product as this makes product launch MACsec services quickly and available for the service.

A person skilled in the art may understand that any known or new algorithms by be used for the implementation of the present application. However, it is to be noted that, the present application provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present application.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the application need not include the device itself.

Although implementations for system, method and devices for simultaneous MACsec key agreement (MKA) negotiation between the devices have been described in language specific to structural features and/or methods, it is to be understood that the appended claims are not necessarily limited to the specific features or methods described. Rather, the specific features and methods are disclosed as examples of implementations of the system, method and devices for simultaneous MACsec key agreement (MKA) negotiation between the devices.

What is claimed is:

1. A system for provisioning a simultaneous key negotiation process, the system having a plurality of port access entities, the system comprising:
   at least one first port access entity, from the plurality of port access entities, configured to:
      initiate a key agreement process by sending a first message with a basic Type-Length-Value (TLV) information to at least one second port access entity from the plurality of port access entities, wherein the TLV information comprises a message number (MN) and a message indicator (MI) unique for and associated with the first message;
      receive a second message with a potential peer TLV from the at least one second port access entity in response to the first message, wherein the potential peer TLV comprises an MN and an MI unique for at least one message received eventually by the at least one second port access entity;
      detect an occurrence of a simultaneous key agreement process session initiation, indicating a race condition, based on the MN in the second message;
      store, in response to the race condition being detected, the MN in the second message; and
      respond by sending a third message to the at least one second port access entity with the stored MN and a live peer TLV to achieve the key agreement process, wherein the third message is sent in response to the MN associated with the first message being received in the potential peer TLV from the at least one second port access entity.

2. The system of claim 1, wherein the race condition is identified in response to the potential peer TLV received from the at least one second port access entity not containing the MN associated with the first message even after the basic TLV information has been sent to the peer at least one second port access entity.

3. The system of claim 1, wherein the key agreement process is a media access control (MAC) security (MACsec) Key Agreement protocol (MKA) key negotiation process.

4. The system of claim 1, wherein the first message is a media access control (MAC) security (MACsec) key agreement protocol data unit (MKPDU).

5. The system of claim 1, wherein the at least one first port access entity receives the MN associated with the first message in the potential peer TLV from the at least one second port access entity under potential or live peer TLV.

6. A method for provisioning a simultaneous key negotiation process to achieve secure communication, the method comprising:
   initiating, by at least one first port access entity, a key agreement process by sending a first message with basic Type-Length-Value (TLV) information to at least one second port access entity, the TLV information comprising a message number (MN) and a message indicator (MI) unique for and associated with the first message;
   receiving, by the at least one first port access entity, a second message with at least a potential peer TLV from the at least one second port access entity in response to the first message, the potential peer TLV comprises an MN and an MI unique for at least one message received eventually by the at least one second port access entity;
   detecting, by the at least one first port access entity, an occurrence of a simultaneous key agreement process session initiation, indicating a race condition, based at least on the MN received with the second message;
   storing, in response to the race condition being detected, by the at least one first port access entity, the MN received with the second message; and
   responding, by the at least one first port access entity, by sending a third message with the stored MN and a live peer TLV to achieve the key agreement process, the third message being sent in response to the MN associated with the first message being received in the potential peer TLV from the at least one second port access entity.

7. The method of claim 6, wherein the race condition indicates that multiple first port access entities initiated the key agreement process simultaneously.

8. The method of claim 6, wherein the race condition is identified in response to the potential peer TLV received from the at least one second port access entity not containing the MN associated with the first message even after the basic TLV information has been sent to the at least one second port access entity.

9. The method of claim 6, wherein the key agreement process is a media access control (MAC) security (MACsec) Key Agreement protocol (MKA) key negotiation process.

10. The method of claim 6, wherein the first message is MAC security (MACsec) key agreement protocol data unit (MKPDU).

11. The method of claim 6, further comprises: receiving, by the at least one first port access entity, the MN associated with the first message in the potential peer TLV from the at least one second port access entity under potential or live peer TLV.

12. A device for provisioning a simultaneous key negotiation process to achieve secure communication, the device comprising:
   a processor;
   a memory coupled to the processor for executing a plurality of modules present in the memory, the plurality of modules comprising:
      a transmitting module configured to initiate a key agreement process by sending a first message with basic Type-Length-Value (TLV) information to at least one first port access entity, the TLV information comprises a message number (MN) and a message indicator (MI) unique for and associated with the first message;
      a receiving module configured to: receive a second message with a potential peer TLV from the at least one first port access entity in response to the first message, the potential peer TLV comprises an MN and an MI unique for at least one message received eventually by the at least one port first access entity;
      a detection module configured to: detect an occurrence of a simultaneous key agreement process session initiation, indicating a race condition, based on the MN received with the second message;

a storage module configured to: store the MN received with the second message in response to the race condition being detected; and a response module configured to: respond by sending a third message to the at least one first port access entity with the stored MN and a live peer TLV to achieve the key agreement process, wherein the third message is sent in response to the MN associated with the first message being received in the potential peer TLV from the at least one first port access entity.

13. The device of claim 12, wherein the race condition indicates that multiple devices initiated the key agreement process simultaneously.

14. The device of claim 12, wherein the race condition is identified in response to the potential peer TLV received from the at least one first port access entity not containing the message number (MN) for the first message even after the basic TLV information has been sent to the at least one first port access entity.

15. The device of claim 12, wherein the key agreement process is a Mac security (MACsec) Key Agreement protocol (MKA) key negotiation process.

16. The device of claim 12, wherein the first message is MAC security (MACsec) key agreement protocol data unit (MKPDU).

17. The device of claim 12, wherein the receiving module is configured to receive the MN associated with the first message in the potential peer TLV from the at least one first port access entity under potential or live peer TLV.

18. The device of claim 12, wherein the device is further configured to, upon occurrence of the race condition, hold responding to the at least one first port access entity until the race condition is avoided.

19. The device of claim 12, wherein the race condition is avoided by a supplicant being reflected in a peer MKA message under potential or live peer TLV.

20. The device of claim 12, wherein the at least one first port access entity is configured to process the first message.

* * * * *

UNITED STATES PATENT AND TRADEMARK OFFICE
CERTIFICATE OF CORRECTION

PATENT NO.      : 10,904,368 B2
APPLICATION NO. : 16/420959
DATED           : January 26, 2021
INVENTOR(S)     : Dharmanandana Reddy Pothula Page 1 of 1

It is certified that error appears in the above-identified patent and that said Letters Patent is hereby corrected as shown below:

In the Claims

In Column 13, Line 49, Claim 2, delete "peer".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*